Aug. 18, 1936.  C. C. WINTERSTEIN  2,051,401
TEMPERATURE CONTROL FOR GAS RANGES
Filed Sept. 13, 1934   3 Sheets-Sheet 1

INVENTOR
Clarence C. Winterstein
BY
Augustus B. Stoughton.
ATTORNEY.

WITNESS:

Aug. 18, 1936.   C. C. WINTERSTEIN   2,051,401
TEMPERATURE CONTROL FOR GAS RANGES
Filed Sept. 13, 1934   3 Sheets-Sheet 2
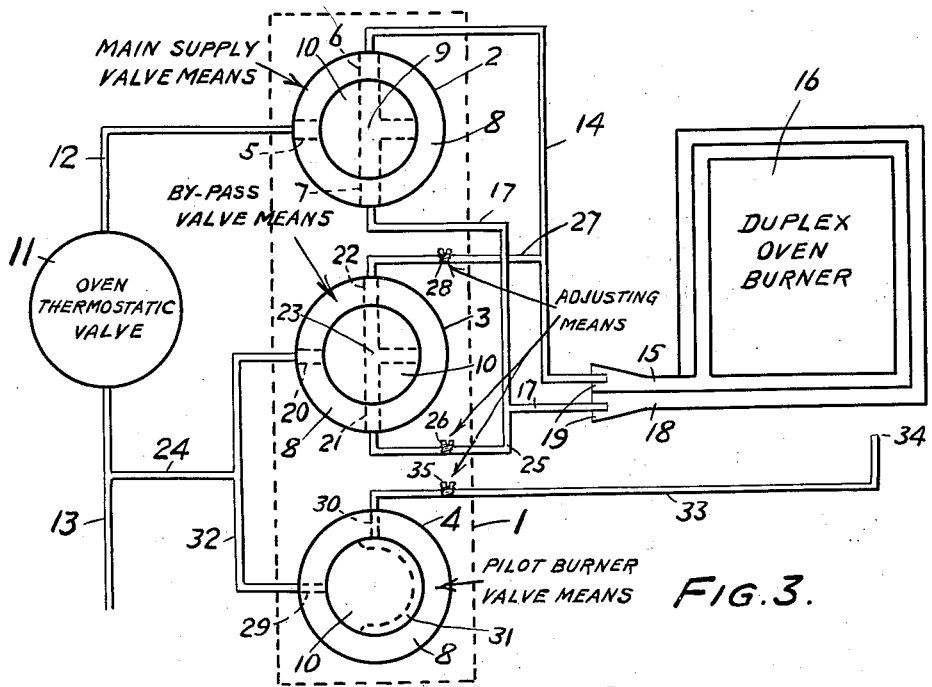
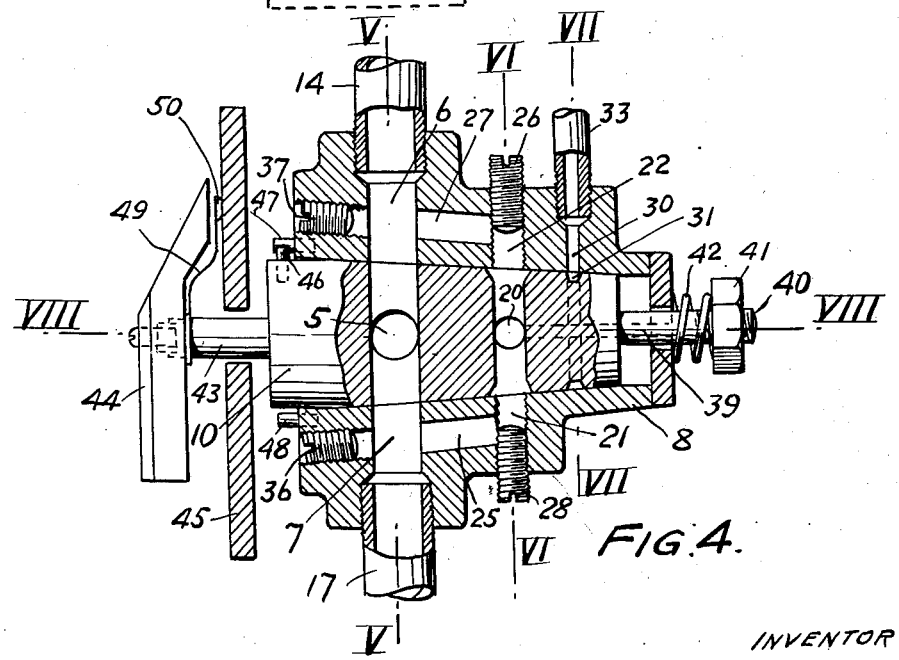
WITNESS:
INVENTOR
Clarence C. Winterstein
BY
Augustus B. Stoughton
ATTORNEY.

Aug. 18, 1936.    C. C. WINTERSTEIN    2,051,401
TEMPERATURE CONTROL FOR GAS RANGES
Filed Sept. 13, 1934    3 Sheets—Sheet 3

WITNESS:

INVENTOR
Clarence C. Winterstein
BY
Augustus B. Stoughton
ATTORNEY.

Patented Aug. 18, 1936

2,051,401

UNITED STATES PATENT OFFICE 2,051,401

TEMPERATURE CONTROL FOR GAS RANGES

Clarence C. Winterstein, Chestnut Hill, Pa., assignor to The United Gas Improvement Company, Philadelphia, Pa., a corporation of Pennsylvania Application September 13, 1934, Serial No. 743,805

21 Claims. (Cl. 236—15)

The present invention relates to the control of temperatures in gas ranges and other gas-burning appliances.

In the automatic temperature control of gas ranges, such as the automatic control of oven temperatures, it is customary to control the temperature by controlling the flow of gas to the oven burner by a valve actuated by thermostatic means responsive to the oven temperature. When graduated (slow-acting or modulated) thermostats are used, it is customary to provide a by-pass around the thermostatic valve, permitting a small flow of gas to the burner to provide a minimum so-called maintaining flame on the burner to prevent flame extinguishment whenever the thermostatic valve may be closed.

This maintaining flame is made as low as possible, consistent with safe operation, to permit the maintenance of the low temperatures desired for certain cooking operations. Even with non-insulated ranges, this minimum flame is usually too high to permit oven temperatures as low as 250° F., which is the customary lowest marking on the control dial of the thermostat. With the advent of the insulated range, the trouble has become still more marked and is universally recognized. It has been proposed to start the dial markings at 300° F. Some cooking recipes, however, call for lower temperatures and it is desirable to be able to provide such lower temperatures. Another procedure might consist in decreasing the size of the burner and therefore decreasing the permissible bypass rate. This would permit the lower temperatures, but would sacrifice quick heating to the higher temperatures.

The principal object of the present invention is to provide means whereby the desired low temperatures may be conveniently and safely maintained without sacrificing quick heating to the higher temperatures.

Generally stated, in accordance with my invention I provide two burners which may be separate burners or two parts of a duplex burner. Means are provided to supply gas to each burner through a thermostatic valve operated by means responsive to the oven temperature. Means are also provided to supply to each burner gas by-passed around the thermostatic valve to provide the maintaining flames. A pilot burner is also provided, and means to supply to it gas bypassed around the thermostatic valve. Interposed in the flow of gas from the thermostatic valve to each of the burners (which I will term the main flow) and in the bypass flow to each of the burners as well as in the bypass flow to the pilot burner (when automatic ignition is not provided), I provide a single operating means controlling valve means adapted to pass the main flow and the bypass flow to both burners simultaneously as well as the bypass flow to the pilot burner (when automatic ignition is not provided) or to pass the main flow and bypass flow to one burner and the bypass to the pilot burner (when automatic ignition is not provided) with the main flow and bypass flow to the other burner shut-off or to shut off the main and bypass flows to both burners and the pilot burner (when automatic ignition is not provided), depending on the selected position of the valve means. In the case that automatic ignition is provided, it is of course necessary to provide the usual shut-off device which may be arranged to control the gas flow through the inlet to the main flow portion of the cock or the gas flow from the two outlets from the main flow portion of the cock.

The individual burners are provided of such size that the bypass rate to one of them will be sufficiently low to permit the maintenance of the desired low temperature and the combined heating capacity of both together sufficiently great to provide the desired quick heating to the higher temperatures. The burners need not be of the same capacity, although it is desirable.

When automatic ignition is provided, the pilot burner is not controlled by the valve means as it is then intended to burn continuously even when both cooking burners are shut off.

A convenient valve means is a nest or gang of cocks operated together by a single operating means or a single cock provided with the necessary plurality of gas inlets and outlets through the barrel and the requisite passages through the cock plug. The latter form has been chosen for illustration in the accompanying figures which form a part of this specification and which show a form of the apparatus of the invention chosen for illustration, and in which:

Fig. 3 shows diagrammatically the apparatus of Fig. 1, with all burners shut off.

Fig. 4 shows in partial section and partial plan a single cock adapted for employment in accordance with the invention.

Figure 1:
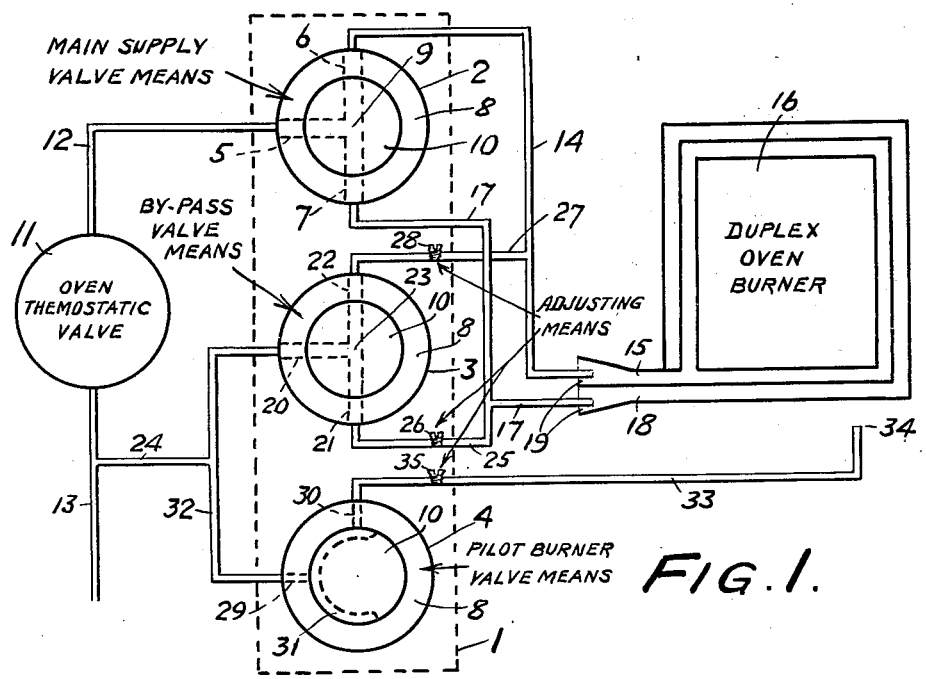
Fig. 1 shows diagrammatically a form of the apparatus of the invention, positioned for high temperature cooking.

Referring to Fig. 1; 1 generally and diagrammatically indicates a cock provided with three separate sets of gas passages or a set of three cocks which may be rotated simultaneously by a single operating means and each having a set of gas passages. In either case the sets of gas passages are diagrammatically indicated at 2, 3 and 4. In the further description of Fig. 1, it is assumed that the separate sets of gas passages are provided in the plug and barrel of a single cock. Set of gas passages 2, which is termed the main flow set, is comprised of the gas inlet port 5 and gas outlet ports 6 and 7 through the cock barrel 8 and the three-way passage 9 in the plug 10. The gas inlet port 5 is connected through the thermostatic valve 11 and the pipe 12 with the gas supply means 13.

Gas outlet port 6 communicates by pipe 14 with one burner 15 of a duplex burner generally indicated at 16. Gas outlet port 7 communicates by pipe 17 with the other burner 18 of the duplex burner. 19 indicates the primary air supply means to the burners.

When the cock is positioned as shown in Fig. 1, gas is supplied from the gas supply through the thermostatic valve 11, pipe 12, gas inlet port 5 and the three-way passage 9 in the plug 10 to the two gas outlet ports 6 and 7 and thence through pipes 14 and 17 to both of the two burners 15 and 18, respectively.

The set of gas passages 3, which is termed the bypass set in the cock, is comprised of the gas inlet port 20 and the gas outlet ports 21 and 22 in the cock barrel 8 and the three-way passage 23 in the plug 10. Gas inlet port 20 is connected by pipe 24 with the gas supply 13. Gas outlet port 21 is connected by pipe 25 with pipe 17 leading to burner 18. 26 is a valve means, such as for instance an adjusting screw, for adjusting the gas flow through pipe 25. Gas outlet port 22 is connected by pipe 27 with pipe 14 leading to burner 15. 28 is a valve means, such as for instance an adjusting screw, for adjusting the flow through pipe 27. With the cock in the position shown in Fig. 1, gas is bypassed around the thermostatic valve 11 to both burners 15 and 18 flowing through pipe 24, gas inlet port 20 and the three-way passage 23 in the cock plug 10 to the gas outlet ports 21 and 22. Gas flows through pipes 27 and 14 to the burner 15 and through pipes 25 and 17 to burner 18, the bypass flows to the two burners being regulated by the valve means 26 and 28. These valve means are adjusted to provide the required minimum flow to the two burners for the maintenance of the flames, when the thermostatic valve 11, in response to its actuating thermostatic element or through manual operation, cuts off the main flow to the burners through the burner set of passages 2. The design of the passage 23 in the bypass set 3 may be such that gas is cut off from the bypass outlets slightly after the outlets in the main flow set 2 are cut off.

The set of gas passages 4 in the cock, which is termed the pilot set, is comprised of the gas inlet port 29 and the gas outlet port 30 in the cock barrel and the passage 31 formed in the face of the plug and extending more than half-way around its periphery, if the outlet passages in the main flow and bypass sets are arranged 180° apart as illustrated in the figures. Gas inlet port 29 is connected by pipe 32, with the gas supply means 13 through the bypass pipe 24. Gas outlet port 30 is connected by pipe 33 to the pilot burner 34. 35 is a valve means or other means for adjusting the flow of gas to the pilot burner. The design of passage 31 may be such that gas is admitted to the pilot slightly in advance of admission to the burners and is cut off from the pilot slightly after the main flow and bypass sets are cut off.

With the cock in the position illustrated in Fig. 1, a small flow of gas is maintained from the gas supply 13 through pipes 24 and 32, gas inlet port 29, passage 31 between the cock barrel and the cock plug, the gas outlet port 30, and pipe 33 to the pilot burner 14 irrespective of the position of the thermostatic valve 11.

Figure 2:
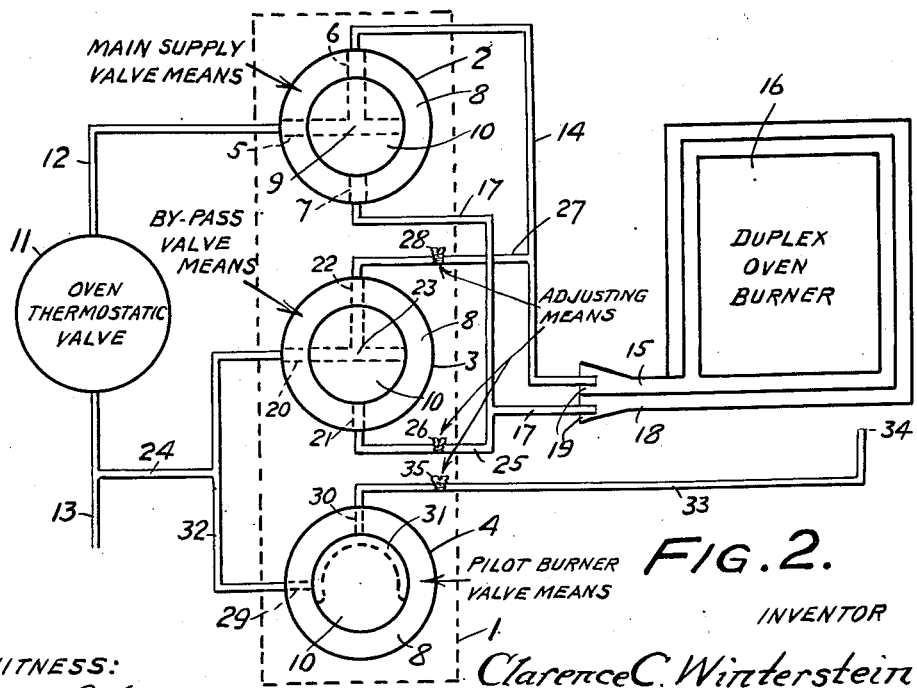
Fig. 2 shows diagrammatically the apparatus of Fig. 1 positioned for low temperature cooking.
Figure 5:
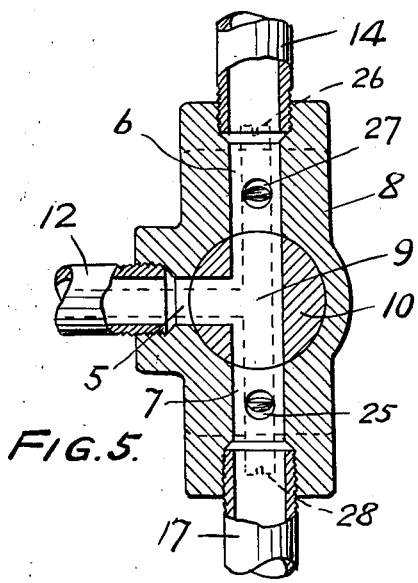
Fig. 5 shows a cross-section along the line V—V in Fig. 4.
Figure 6:
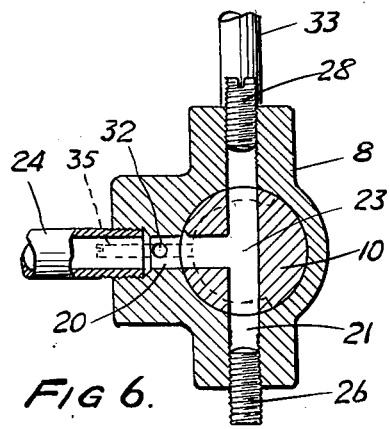
Fig. 6 shows a cross-section along the line VI—VI in Fig. 4.
Figure 7:
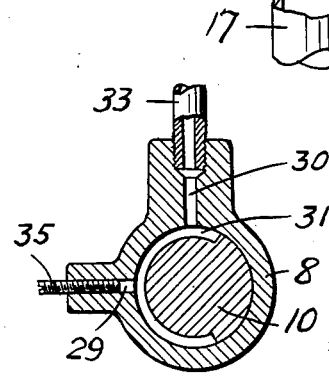
Fig. 7 shows a cross-section along the line VII—VII in Fig. 4.
Figure 8:
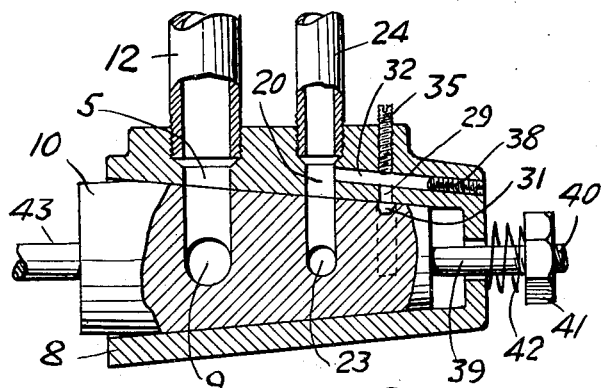
Fig. 8 shows a cross-section along the line VIII—VIII in Fig. 4.

Referring to Fig. 2: In this figure the cock plug of Fig. 1 has been rotated 90° clockwise. In the main flow set the gas outlet port 7 is shut off by the solid portion of the plug while gas may flow through the gas inlet passage 5 to the gas outlet passage 6 and thence to burner 15.

In the bypass set the bypass outlet port 21 is shut off by the solid portion of the plug while gas flows from the inlet port 20 to the outlet port 22 and thence by pipe 27 to burner 15, supplying the maintaining flame when the thermostatic valve shuts off the main flow.

In the pilot set the flow is maintained from the inlet 29 through the passage 31, the outlet 30 and pipe 33 to the pilot burner 34 maintainng the pilot flame.

In Fig. 3 the cock plug has been further rotated clockwise, cutting off the inlet ports in the main flow, bypass and pilot sets from all of the respective outlet ports, and cutting off the main and bypass flows to both burners as well as the flow to the pilot burner.

Referring to Figs. 4, 5, 6, 7 and 8: These figures illustrate a form of the cock diagrammatically illustrated in the previous figures. Parts performing the same function as those diagrammatically illustrated in the previous figures are given the same numbers. The sections shown in Figs. 5, 6 and 7 will be seen to be similar to the main flow, bypass and pilot sets of passages indicated diagrammatically as 2, 3 and 4 in the previous figures, except that the communications between the main flow and bypass gas outlet ports are provided in the cock barrel instead of by external piping, and one inlet pipe serves to supply gas to both the bypass and pilot inlet ports, which are in communication by way of a passage provided in the cock barrel. These provisions reduce the external piping required.

5 is the gas inlet port, while 6 and 7 are the gas outlet ports in the barrel 8 to and from the main flow set. 9 is the main flow three-way passage in the cock plug 10. Pipe 12 leads from the thermostatic valve (not shown) to the inlet port 5. Pipes 14 and 17 lead from the outlet ports 6 and 7, respectively, to the burners (not shown). 20 is the gas inlet port and 21 and 22 the gas outlet ports to and from the bypass set, while 23 is the bypass three-way passage in the cock plug. 25 and 27 are passages provided in the cock barrel connecting the main flow and bypass outlet ports. 26 and 28 are adjusting screws controlling flow of gas through the outlet ports 21 and 22, respectively. The passages 25 and 27 may be conveniently drilled through the barrel from one end, tapped and the ends of the passages stopped in a gas-tight manner by the threaded plugs 36 and 37 which may be conveniently removed when necessary for cleaning the passages.

29 is the gas inlet port, and 30 the gas outlet port to and from the pilot set. 31 is the passage formed between interior of the barrel and the face of the cock plug. Passage 32, provided in the barrel, connects the bypass inlet port 28 and the pilot port 29 and serves to supply gas to the pilot set, as controlled by the adjusting screw 35. Pipe 33 leads to the pilot burner (not shown).

The passage 32 may be conveniently drilled in the barrel from the barrel end, tapped and stopped by the threaded plug 38, which may be readily removed for cleaning the passage.

39 indicates the cock plug stem, threaded at 40 to engage the nut 41. 42 is a spring member which holds the cock plug tightly in the barrel. 43 indicates the cock plug handle stem. 44 is the handle, which sweeps over a dial 45 which is provided with high, low and off markings to correspond with the "two burners on," "one burner on," and "both burners off" positions of the cock. 46 is a stop member on the cock plug co-operating with stop members 47 and 48 on the barrel to stop the rotation of the cock plug at the high and off positions, respectively.

Figure 9:
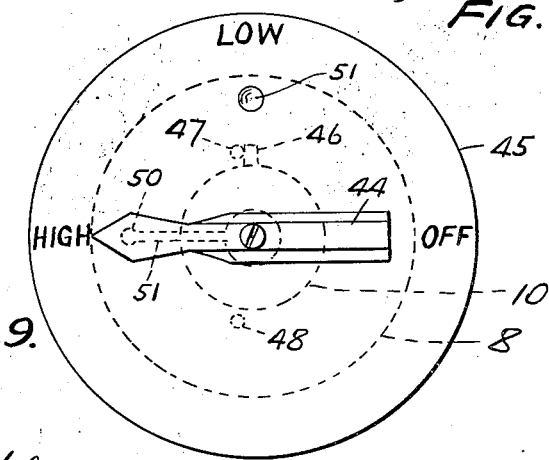
Fig. 9 shows an elevation of the cock dial.

Semi-stop means may be provided to arrest the cock plug rotation at the low position, as best seen in Fig. 4, such as for instance the spring member 49 which bears on the face of the dial and is provided with a cup-shaped portion 50, which is adapted to drop into the cupped depression 51 (Fig. 9) in the dial face at the low position, requiring some slight force to turn the cock farther in either direction.

While the invention has been described in connection with the employment of two burners, it will be obvious that, although it would considerably complicate the apparatus with additional cock passages and piping, more than two burners might be employed.

Furthermore, while the invention has been described specifically in connection with the temperature control of gas ranges, for which it has been particularly developed, it may have other applications in the field of apparatus heated by gas.

Modifications of the apparatus described and illustrated will readily occur to those skilled in the art without departing from the spirit of the invention, which is limited in scope only as the prior art and the appended claims may require.

I claim:—

1. A gas-consuming device comprising in combination, a gas supply means, a plurality of gas burners, main supply conduits leading from said gas supply means to said burners, a thermostatic valve controlling the flow of gas through said main supply conduits and responsive to heat generated by said burners, main supply valve means controlling the flow of gas through said main supply conduits, bypass conduits leading from said gas supply means to said burners and bypassing said thermostatic valve and said main supply valve means, bypass valve means controlling the flow of gas through said bypass conduits, and a single operating means controlling said main supply valve means and said bypass valve means.

2. A gas-consuming device comprising in combination, a gas supply means, a plurality of gas burners, main supply conduits leading from said gas supply means to said burners, a thermostatic valve controlling the flow of gas through said main supply conduits and responsive to heat generated by said burners, main supply valve means controlling the flow of gas through said main supply conduits, bypass conduits leading from said gas supply means to said burners and bypassing said thermostatic valve and said main supply valve means, bypass valve means controlling the flow of gas through said bypass conduits, adjusting means in said bypass conduits, and a single operating means controlling said main supply valve means and said bypass valve means.

3. A gas-consuming device comprising in combination, a gas supply means, a plurality of gas burners, main supply conduits leading from said gas supply means to said burners, a thermostatic valve controlling the flow of gas through said main supply conduits and responsive to heat generated by said burners, main supply valve means controlling the flow of gas through said main supply conduits, bypass conduits leading from said gas supply means to said burners and bypassing said thermostatic valve and said main supply valve means, bypass valve means controlling the flow of gas through said bypass conduits, a pilot burner, a conduit connecting said gas supply means and said pilot burner, pilot burner valve means in said last-mentioned conduit, and a single operating means controlling said main supply valve means and said bypass valve means and said pilot burner valve means.

4. A gas-consuming device comprising in combination, a gas supply means, a plurality of gas burners, main supply conduits leading from said gas supply means to said burners, a thermostatic valve controlling the flow of gas through said main supply conduits and responsive to heat generated by said burners, main supply valve means controlling the flow of gas through said main supply conduits, bypass conduits leading from said gas supply means to said burners and bypassing said thermostatic valve and said main supply valve means, bypass valve means controlling the flow of gas through said bypass conduits, a pilot burner, a conduit connecting said gas supply means and said pilot burner, pilot burner valve means in said last-mentioned conduit, adjusting means in said last-mentioned conduit, and a single operating means controlling said main supply valve means and said bypass valve means and said pilot burner valve means.

5. In a temperature control for gas ranges, the combination of, a gas supply means, a plurality of gas burners, a main flow conduit connected to said gas supply means, a thermostatic valve controlling the flow of gas through said main flow conduit, a bypass conduit connected to said gas supply means and bypassing said thermostatic valve, and a gas cock comprising a barrel having a main flow inlet therein connected to said main flow conduit and having a bypass inlet therein connected to said bypass conduit, a cock plug having main flow passages therein co-operating with said main flow inlet and having bypass passages therein co-operating with said bypass inlet, means for operating said cock plug, said barrel having outlets therein co-operating with said main flow passages and with said bypass passages, and conduits connecting said outlets with said burners.

6. A combination according to claim 5 in which the barrel has adjusting screws therein controlling the flow of gas from the bypass passages to the outlets.

7. A gas cock comprising, a barrel having a main flow inlet therein, a bypass inlet in said barrel separate from said main flow inlet, a cock plug mounted in said barrel and having T-shaped main flow passages therein co-operating with said main flow inlet and having T-shaped bypass passages therein co-operating with said bypass inlet, said barrel having outlets therein co-operating with said main flow passages and with said bypass passages, means for actuating said cock plug, and stops on said barrel limiting the movement of said cock plug.

8. A gas cock comprising, a barrel having a main flow inlet therein, a bypass inlet in said barrel separate from said main flow inlet, a cock plug mounted in said barrel and having main flow passages therein co-operating with said main flow inlet and having bypass passages therein co-operating with said bypass inlet, said barrel having outlets therein co-operating with said main flow passages and with said bypass passages, and means for actuating said cock plug to bring said main flow passages and said bypass passages into and out of registry with said main flow inlet and with said bypass inlet respectively and with said outlets.

9. A device heated by gas combustion comprising in combination: a gas supply means, a plurality of gas burners, main supply conduits leading from said gas supply means to said burners, main supply valve means controlling the flow of gas through said main supply conduits, a thermostatic valve controlling the flow of gas to said main supply valve means and responsive to heat generated by said burners, bypass conduits communicating with said gas supply means and said burners and bypassing said thermostatic valve and said main supply valve means, bypass valve means controlling the flow of gas through said bypass conduits, and a single operating means controlling said main supply valve means and said bypass valve means.

10. A temperature control device for ovens and the like comprising a plurality of burners arranged in the oven, a valve casing outside the oven, connections from the valve casing to each of the burners, a main fuel supply means connected to the valve casing, a thermostatically controlled valve governing the flow of fuel from the main supply means to the burners, a bypass conduit by-passing the thermostatically controlled valve, and a valve in said casing to selectively connect one or more of the burner connections to the main supply fuel means and to the by-pass conduit.

11. A temperature control device for ovens and the like comprising a plurality of burners arranged in the oven, a valve casing outside the oven, connections from the valve casing to each of the burners, a main fuel supply means connected to the valve casing, a thermostatically controlled valve governing the flow of fuel from the main supply means to the burners, a by-pass conduit by-passing the thermostatically controlled valve, a pilot burner in the oven, a connection from the valve casing to the pilot burner, and a valve in the casing to selectively connect one or more of said burner connections to the main fuel supply means and to the by-pass conduit, and also to connect the pilot burner connection to the source of fuel when one or more of said burner connections is open.

12. A temperature control device for ovens and the like comprising a plurality of burners arranged in the oven, a valve casing outside the oven, connections from the valve casing to each of the burners, a main fuel supply means connected to the valve casing, a thermostatically controlled valve governing the flow of fuel from the main supply means to the burners, a plurality of by-pass passages in the valve casing for gas flowing from the main fuel supply means to the burners and by-passing the thermostatically controlled valve, and a valve in said casing to selectively connect one or more of the burner connections to the main fuel supply means and to one or more of the by-pass passages.

13. A temperature control device for ovens and the like comprising a plurality of burners arranged in the oven, a valve casing outside the oven, connections from the valve casing to each of the burners, a main fuel supply means connected to the valve casing, a thermostatically controlled valve governing the flow of fuel from the main supply means to the burners, a plurality of by-pass passages in the valve casing for gas flowing from the main fuel supply means to the burners and by-passing the thermostatically controlled valve, a pilot burner in the oven, a connection from the valve casing to the pilot burner, and a valve in said casing to selectively connect one or more of the burner connections to the main fuel supply means and to one or more of the by-pass passages, and also to connect the pilot burner connection to the source of fuel when one or more of said burner connections is open.

14. A gas range having an oven and two burners in the oven, in combination with means for supplying and controlling the flow of gas to the burners comprising a main gas supply conduit, a thermostatically controlled valve regulating the flow of gas from the conduit to the burners, and a valve connected to the conduit and to the burners and having a valve-member therein which is movable to connect the burners to the conduit for the supply of gas thereto under the control of the thermostatically controlled valve and to connect one of the burners to the conduit independently of the thermostatically controlled valve.

15. A gas range having an oven and two burners in the oven, in combination with means for supplying and controlling the flow of gas to the burners comprising a main gas supply conduit, a thermostatically controlled valve regulating the flow of gas from the conduit to the burners, and a valve connected to the conduit and to the burners and having a valve-member therein which is movable to connect the burners to the conduit for the supply of gas to both of the burners under the control of the thermostatically controlled valve and to connect both of the burners to the conduit independently of the thermostatically controlled valve.

16. A gas range having an oven and two burners in the oven, in combination with means for supplying and controlling the flow of gas to the burners comprising a main gas supply conduit, a thermostatically controlled valve regulating the flow of gas from the conduit to the burners, and a valve connected to the conduit and to the burners and having a valve-member therein which is movable to either of two positions in one of which it connects the burners to the conduit for the supply of gas thereto under the control of the thermostatically controlled valve and also independently of that valve, and in the other of which it connects one of the burners to the gas supply conduit for the supply of gas thereto under the control of the thermostatically controlled valve and also independently of that valve.

17. A gas range having an oven and two burners in the oven, in combination with means for supplying and controlling the flow of gas to the burners, comprising a main gas supply conduit, a thermostatically controlled valve regulating the flow of gas from the conduit to the burners, and a valve connected to the conduit and to the burners and having a valve-member therein which is movable to one position in which it connects the burners to the conduit for the supply of gas thereto under the control of the thermostatically controlled valve and also independently of that valve, and to a second position in which it connects one of the burners to the gas supply conduit for the supply of gas thereto under the control of the thermostatically controlled valve and also independently of that valve, and to a third position in which it shuts off the connection of the burners to the gas supply conduit.

18. A gas range having an oven and two heating burners and a pilot burner in the oven, in combination with means for supplying and controlling the flow of gas to all of the said burners comprising a main gas supply conduit, a thermostatically controlled valve regulating the flow of gas from the conduit to the two heating burners, and a valve connected to the conduit and to the burners and having a valve-member therein which is movable to connect the burners to the conduit for the supply of gas thereto under the control of the thermostatically controlled valve and to connect one of the burners to the conduit independently of the thermostatically controlled valve and to connect the pilot burner to the conduit independently of the thermostatically controlled valve when gas is supplied to one of the burners.

19. A gas range having an oven and two heating burners and a pilot burner in the oven, in combination with means for supplying and controlling the flow of gas to all of the said burners, comprising a main gas supply conduit, a thermostatically controlled valve regulating the flow of gas from the conduit to the two heating burners, and a valve connected to the conduit and to the burners and having a valve-member therein which is movable to either of two positions in one of which it connects the burners to the conduit for the supply of gas thereto under the control of the thermostatically controlled valve and also independently of that valve, and in the other of which it connects one of the burners to the gas supply conduit for the supply of gas thereto under the control of the thermostatically controlled valve and also independently of that valve, said movable valve-member being also arranged to supply gas to the pilot burner independently of the thermostatically controlled valve when gas is supplied to one of the burners.

20. A temperature control device for ovens and the like comprising a plurality of burners arranged in the oven, gas supply means, a thermostatically controlled valve governing the flow of fuel from the gas supply means to the burners, a by-pass conduit connected to the gas supply means and by-passing the thermostatically controlled valve, a valve casing connected to the gas supply means and the by-pass conduit, and conduits connecting the valve casing and burners, said valve casing being provided with a movable valve-member and with ports and passages whereby one or more of the burners may be selectively connected to the main supply means and to the by-pass conduit.

21. A temperature control device for gas ovens and the like comprising a plurality of main burners arranged in the oven, a pilot burner arranged in the oven, a valve casing outside the oven, connections from the valve casing to each of the main burners and to the pilot burner, a main fuel supply means connected to the valve casing, a thermostatically controlled valve governing the flow of fuel from the main supply means to the burners, means connecting the valve casing to the main fuel supply and by-passing the thermostatically controlled valve, and a valve in the casing to selectively connect one or more of said burner connections to the main fuel supply means and to also connect the pilot burner connection to the main fuel supply means when one or more of the burner connections is open.

CLARENCE C. WINTERSTEIN.